June 13, 1939.  H. C. RHODES  2,162,641
DOUGH DIVIDING MACHINE CONSTRUCTION
Filed Oct. 23, 1937  2 Sheets-Sheet 2
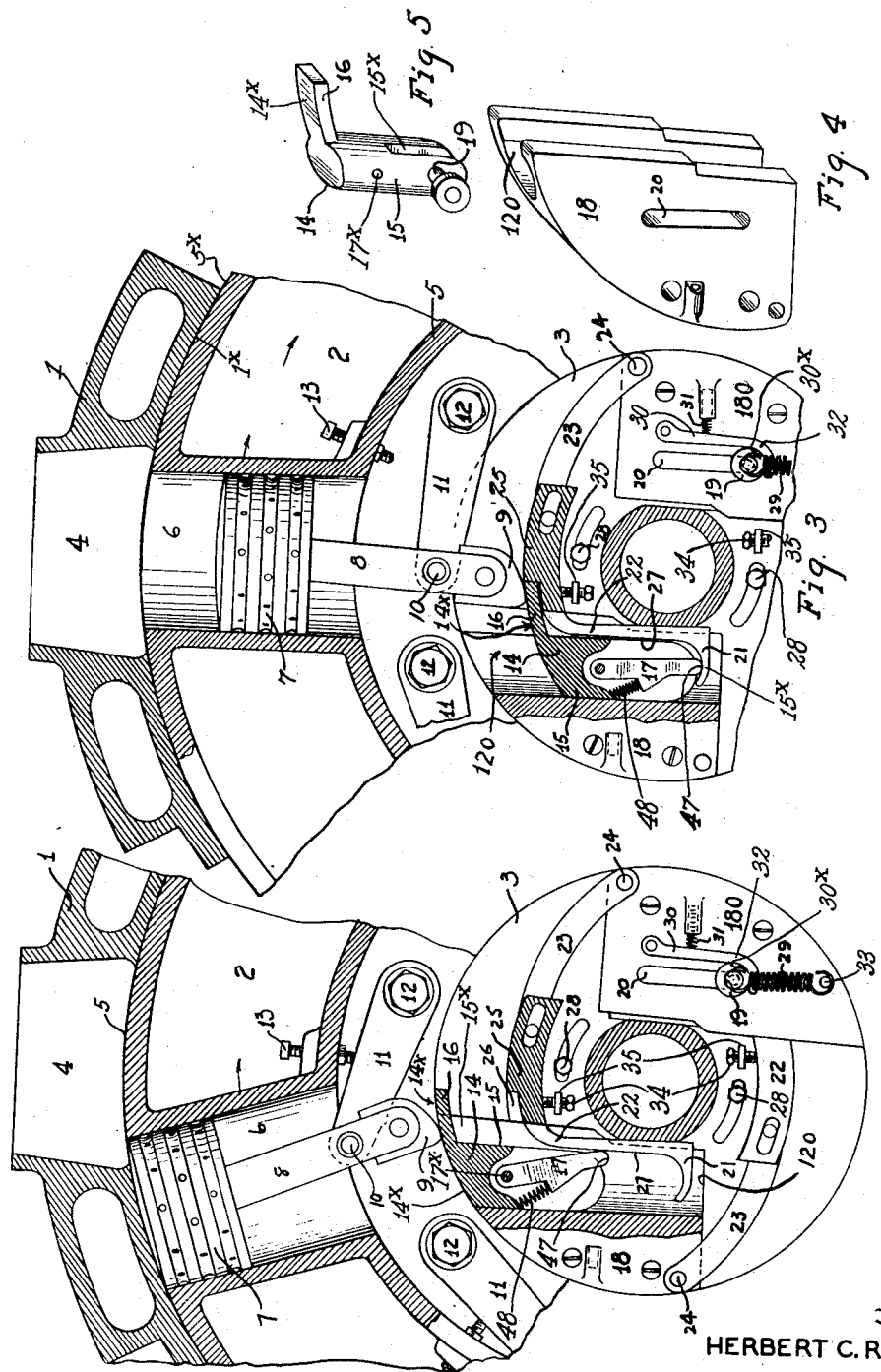
Inventor
HERBERT C. RHODES
By George S. Hastings
Attorney Patented June 13, 1939

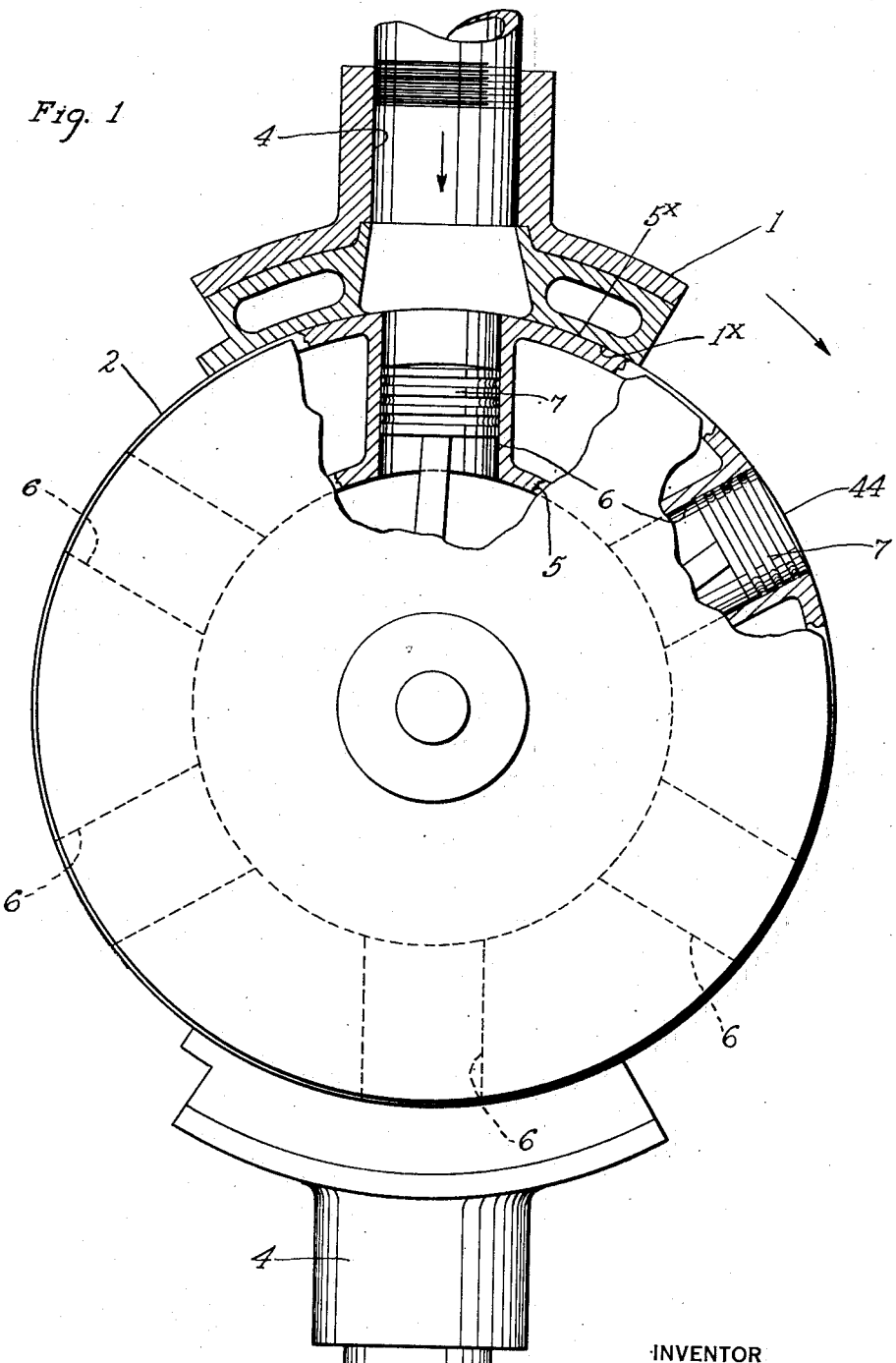

2,162,641

UNITED STATES PATENT OFFICE 2,162,641

DOUGH DIVIDING MACHINE CONSTRUCTION

Herbert C. Rhodes, Portland, Oreg., assignor to American Machine & Foundry Company, a corporation of New Jersey Application October 23, 1937, Serial No. 170,539

22 Claims. (Cl. 107—15)

This invention relates to apparatus for dispensing plastic material, such as dough, especially to a mechanism for dividing such material from a stream of such plastic material supplied from a source thereof under suitable pressure into each of a series of revolving measuring chambers, and more particularly relates to a dough divider in which air under pressure is used to energize the mechanism.

In such prior dough dividers of this general type, energized by air pressure against the dough supply, the operation of the machine is noisy, due to sudden stopping of moving parts, and due also to undesirable impacts of each piston at one end of its stroke, which sudden movements and impacts result from uncontrolled movements of each piston and associated parts in one or both directions.

An object of the present invention is to provide a mechanism for operating the pistons throughout all phases of their operative cycle that will afford control of each piston throughout each such cycle in such a manner as to eliminate the sudden, noisy, movements, and the noisy piston impacts, operating, however, continuously at a satisfactory rate of speed.

In pursuance of the above general object, a further object is to provide in such a mechanism means to apply to the dough a force adapted to charge the several measuring chambers in succession rapidly and also to apply successively to the charges in the several measuring chambers a force adequate normally to discharge rapidly therefrom the charges therein; and also to provide means adapted to retard and silence the operations of said charging and discharging forces.

A further object is to provide, in a dough divider having a plurality of measuring pockets, and pistons reciprocable in said pockets for receiving and discharging measured quantities of dough, the combination with mechanism for positively moving said pistons in one direction during rotation of said rotor, of devices for moving said pistons in the other direction, as a result of the air pressure on the dough, and means for absorbing all shocks resulting from said movements.

Another object is to provide for the above purpose damping means comprising instrumentalities for opposing said movements with a resistance which increases as the movement progresses; also to arrange said resistance to stop the piston positively at the end of the movement, in such a manner that the reversal of the piston at each end of the stroke will be accomplished in a gradual manner and free from the impacts, with their attendant shocks and noises, which are characteristic of existing machines; such movement, under my improved arrangements, being free from rebound, and hence avoiding interference with accuracy of measuring.

A further object is to provide means by which the dough divider mechanism and devices may be rendered adjustable in the respects necessary to facilitate use of the apparatus for supplying dough units in various sizes, and to that end to provide means for limiting the inward movement of the pistons to regulate the amount of dough received in each measuring chamber; also to limit the outer stroke of the pistons, so as to prevent excessive travel toward the mouths of the measuring chambers; also to so dispose the shock-absorbing devices that they will maintain their mutual relationships unchanged for all adjustment of the operating cam devices.

Still another object of the invention is to provide a machine which embodies the desirable improvements above mentioned, and which is compact and sturdy in construction, and inexpensive to fabricate; and which also is so organized as to render the working parts accessible, easy to assemble and easy to inspect and repair, and therefore economical to maintain in proper working condition.

The present invention is, in general, an improvement upon the type of dough divider forming the subject-matter of the patent to Westcott, No. 1,793,981, issued February 24, 1931.

Other objects and features of the invention will be made to appear as the description of the particular physical embodiment selected to illustrate the invention progresses.

In the accompanying drawings, like characters of reference have been applied to corresponding parts throughout the several views which make up the drawings, in which:

Fig. 1 is a general view in plan of part of a dough divider mechanism in the construction of which the present invention has been embodied, the same being partly broken away to reveal interior structure;

Fig. 2 is a fragmentary detail view in horizontal section of a portion of the structure shown in Fig. 1;

Fig. 3 is a view similar to Fig. 2, showing the parts in a different operating position;

Fig. 4 is a detail view, in perspective of a guide block constituting one of the elements of the structure shown in the other views;

Fig. 5 is a detail view in perspective of a cam element constituting a moving element of said structure.

The invention is also an improvement on the apparatus disclosed in my co-pending application, Serial Number 83,102, filed June 2, 1936.

In a now-preferred embodiment of the invention selected for illustration and description, the part designated by the reference character 1 is an arcuate structure adapted to engage the rotor 2, which is of annular shape, and with which may desirably be formed integrally the radially disposed measuring receptacles or pockets 6, the number of which may be determined in accordance with the work to be performed.

In the instance illustrated, the machine is intended to dispense dough to be used in making rolls, loaves of bread or the like, and six cylinders 6 are indicated as provided. These are joined and spaced apart by the webs 5 and 5x, the same being machined to fit snugly for rotation within the inner wall 1x of the arcuate structure 1, the latter also being machined.

An inlet orifice or throat 4 is shown, this being in communication with a source (not shown), such for instance as a pressure tank of plastic material, as for example, dough, preferably of the general type of dough receiver illustrated in the Letters Patent to Westcott, No. 1,793,981, above-referred to, where such a dough receiver is shown in communication with a throat of the same general character as that illustrated herein at 4.

Provision is made, as in the Westcott Patent, by suitable means (not shown) for supplying air to the tank under a predetermined satisfactory degree of pressure adequate to drive the dough into each cylinder 6 as the same is brought in its turn past one of the supply throats 4, there being as many of these throats as desired and found suitable.

The measured portions of dough are discharged in turn from each measuring chamber 6, and removed for suitable disposal, at any convenient position, as for example at the region 44, indicated in Fig. 1. The usual, or any suitable means (not shown) for cutting off the dough units and delivering them for further disposition, may be supplied.

In the present design of the machine, provision is made for filling and discharging each receptacle twice for each revolution thereof, and these operations are performed respectively by the pressure in the dough-supply receiver or receivers mentioned, which act to fill the pockets 6. Discharge of the dough units is effected by pistons 7, one in each cylinder, and each of which is adapted to force the dough out of a cylinder when the cylinder is turned into registry with an extrusion orifice 44.

In order to control these operations, in pursuance of the invention, a central cam disc 3 is provided with mechanism which will now be described.

Each piston rod 8, secured pivotally at its outer end to a piston 7, and carrying at its inner end a cam follower 9, is mounted pivotally at 10 on one end of an arm 11, this arm being likewise attached pivotally at its opposite end 12 to the annular cylinder block 2, substantially as shown in Fig. 2 and Fig. 3.

The limit of the outward or discharging stroke of the reciprocating pistons 7 may be regulated by adjustment of a stop screw 13 mounted in the cylinder block 2. This permits a suitable clearance to be provided between the heads of the pistons and the curved surface 1x, and avoids undesirable shocks.

At certain predetermined points in each revolution of any given cylinder, by rotation of the cylinder block 2, one of the cam followers 9 is engaged with the curved surface of a cam element 14, which, as illustrated in Fig. 3 occupies a sector of the stationary cam disc 3, and the element 14 thus constitutes a cam segment preferably formed as a cylindrical body 15, (Fig. 5), having an arm 16 at its upper end, the element 14 being bifurcated or slotted, as at 15x, at its lower end, to receive a spring-actuated contact arm or strut 17 (see Figs. 2 and 3) mounted swingingly at 17x within the cylindrical body 15, and having an extension 47 below the pivot 17x.

The body 15 is designed to slide in a bore formed in a guide block 18, grooved at 120 to receive the body 15, and the extent of the reciprocating movement of the body in this block is delimited by a pin 19 which is secured to the body and plays in the slot 20 of a guide block, as 18, 180. Each of these guide blocks, of which two are shown, is mounted rigidly on the central disc structure 3, and that portion of the contour of each guide block, as 18, which lies adjacent to the periphery of the disc structure 3, and in continuance of the cam surface of the cam element 14, conforms in shape thereto.

The contact arm 17 bears against the curved inner edge 27 of a J-shaped abutment bracket 22, which depends from the body 25 of the abutment, the latter in turn being connected by a link 23 to a pivot post 24 fixed in the face of the cam disc 3.

The portion 25 of the bracket 22 is curved to conform to the curvature of the top of the reciprocating cam element 14, and is recessed, as at 26, to receive the arm 16, sufficient clearance being provided so that the inner surface of the arm 16 does not contact with the bottom of the recess.

When the rotation of the cylinder block 2 causes a given cylinder 6 to register with a given inlet port or throat 4, the pressure of the entering dough forces the piston 7, piston rod 8 and cam follower 9 inwardly, while engaging the cam surface 14x, and causes the cam element 14 to descend in the grooved guide block 18, as shown in Fig. 3; and since the contact arm 17 is held against the edge 27 of the J-shaped bracket 22 by a coiled spring 48, as shown, and the edge 27 curves at the inner side of the J, the inward movement of the cam element 14 is retarded gradually and is eventually stopped, so that the change in direction of travel of each piston will be effected gradually and quietly.

The downward extent of segment travel is indicated in Fig. 3, and the limit of such inward travel may be regulated by providing a suitable means for adjusting the angular position of the curved arm 23, and its attached J-shaped bracket 22, relatively to the guide block 18; and, also, the guide block 18 may be moved for purposes of adjustment concentric with the disc 3, by manipulating the cap screws 28, and rotating partially the disc, with the guide block fixed thereon as already described. The limit of inward movement of the abutment body 25 may be regulated by setting a set screw 34 in a lug 35, the free end of the set screw 34 bearing against the inner edge of body 25. The screw bolt 28 controls adjustably the timing of the pistons 7, and the screw 34 controls the capacity of the measuring chambers 6, so that the size of the dough units may be varied at will.

The pistons 7 are returned to the normal outward position shown in Fig. 1, and each is thereby caused to discharge the contents in its measuring chamber 4, by the action of the cam follower 9, which, as shown in Fig. 3, is adapted to ride over the arm 16 of the cam segment 14, then over the curved body 25, and along the link 23 to and over the point where the latter merges into the peripheral track of the cam 3.

The head of each pin 19 travels along the directing surface 30x of the J-shaped member 30, which is curved at 32 and is held against the head of the pin by the expansion of coil spring 31 and a spring 29 biases each cam segment 14 to its outer position. Thus the member 30 acts to retard the movement of the segment toward the end of its outward stroke, so that the reversing of the direction of movement of each segment at this phase of its cycle is effected gradually, and the segment is stopped without shock or noise.

I claim:

1. In a dough divider having a source of supply of dough under pressure, a rotor provided with a plurality of pockets arranged to communicate periodically with said source and pistons reciprocable in said pockets for receiving and discharging measured quantities of dough; the combination with mechanism for moving said pistons in one direction, during rotation of said rotor, to discharge dough from said pockets, of devices permitting movement of said pistons in the other direction, in response to the pressure of dough from said source, to receive a charge, and means for damping said charge-receiving movement of the pistons.

2. In a dough divider having a source of supply of dough under pressure, a rotor provided with a plurality of pockets arranged to periodically communicate with said source and pistons reciprocable in said pockets for receiving and discharging measured quantities of dough; the combination with a cam mechanism for moving said pistons in one direction, during rotation of said rotor, to discharge dough from said pockets, of devices constructed and arranged to permit movement of said pistons in the other direction in response to the pressure of dough from said source, to receive a charge; means to adjust the range of movement of said devices to control the size of the individual deliveries of dough; and means for damping said charge-receiving movement of the pistons, said means being adapted to retard and silence said charging operation.

3. A dough divider having the features claimed in claim 2, in which said damping means are so constructed and arranged as to resist yieldingly the charging movements of said pistons, and are so disposed that the damping effect is substantially the same regardless of the adjusted position of said cam devices.

4. A dough divided having the features claimed in claim 2, in which said cam is adjustable bodily, and in which said damping means has a part mounted on said adjustable cam and adapted to retain the same relative position with respect to the cam as the latter is adjusted.

5. A dough divider having the features claimed in claim 2, in which said damping means comprises instrumentalities for applying said damping action with a resistance which increases as the movement progresses.

6. A dough divider having the features claimed in claim 2, in which said damping means comprises instrumentalities for applying said damping action with a resistance which increases as the movement progresses, and which are arranged to stop the pistons positively at the end of said damping action.

7. A dough divider having the features claimed in claim 2 in which the cam is provided with a plurality of segments and means are also provided for damping the outward movements of the cam segments.

8. A dough divider having the features claimed in claim 2 in which means are also provided for limiting positively the outward range of the discharge movements of the pistons.

9. In a dough divider having a source of supply of dough under pressure and a rotor provided with a plurality of measuring chambers arranged to communicate periodically with said source and having pistons reciprocable in said chambers for receiving and discharging measured quantities of said dough: the combination with said pistons of an operating cam device disposed centrally of said rotor and comprising a disc with a peripheral cam track adapted to move said pistons outward periodically to discharge the charges of dough from said chambers; said cam device having a sector of said peripheral track provided with a cam segment adapted to retire under the charging pressure communicated through the dough and through the pistons in turn; and means to damp said retirement.

10. In a dough divider having a source of supply of dough under pressure and a rotor provided with a plurality of measuring chambers arranged to communicate periodically with said source and having pistons reciprocable in said chambers for receiving and discharging measured quantities of said dough: the combination with said pistons of an operating cam device disposed centrally of said rotor and comprising a peripheral cam track adapted to move said pistons outward periodically to discharge the charges of dough from said chambers; said cam device having a sector of said peripheral track provided with a cam segment adapted to retire under the charging pressure communicated through the dough and through the pistons in turn; and means to damp said retirement, said damping means comprising a J-shaped abutment member mounted on the body of the cam, and a swinging strut carried by the cam segment with its free end in position to be engaged progressively with the inner arcuate foot of the J-shaped member.

11. A dough divider having the features claimed in claim 10, in which a spring is provided to bias said strut swingingly toward the shank of said J-shaped member.

12. In a dough divider having a source of supply of dough under pressure and a rotor provided with a plurality of measuring chambers arranged to communicate periodically with said source and having pistons reciprocable in said chambers for receiving and discharging measured quantities of said dough: the combination with said pistons of an operating cam device disposed centrally of said rotor and comprising a peripheral cam track adapted to move said pistons outward periodically to discharge the charges of dough from said chambers; said cam device having a sector of said peripheral track provided with a cam segment adapted to retire under the charging pressure communicated through the dough and through the pistons in turn; and means to damp said retirement, said cam device being further characterized by a bearing block mounted upon said cam disc and having a cylindrical bore extending inward from the peripheral cam track to receive slidingly a cylindrical portion of said cam segment, the outer face of said cam segment and of said block being arcuate in substantial conformity with the curvature of said peripheral cam track.

13. A dough divider having the features claimed in claim 12 in which a spring is connected between said segment and cam block tending to bias the segment outwardly toward its position of conformity with the periphery of the cam device.

14. A dough divider having the features claimed in claim 9 in which said damping means includes an abutment member having a body portion movable for adjustment toward and away from the peripheral cam track, said abutment member being connected by a link to a pivot carried by the cam disc adjacent to the peripheral cam track, the outer surface of the link constituting a cam track portion merging into the peripheral cam track in every adjusted position of said body of the abutment member.

15. A dough divider having the features claimed in claim 9 in which said damping means comprises a strut on said segment; an abutment member having a J-shaped foot adapted to cooperate with said strut, and a pivot link connected with the cam disc adjacent to the peripheral track, said body having also a shoulder and said segment having an arm adapted to extend over said shoulder in substantial conformity with the outer curvature thereof, serving as a complemental cam track portion.

16. A dough divider having the features claimed in claim 9 in which said damping means comprises a strut, an abutment member having a J-shaped foot adapted to cooperate with said strut, and a pivot link connected with the cam disc adjacent to the peripheral track, said body having also a shoulder, and said segment having an arm adapted to extend over said shoulder in substantial conformity with the outer curvature thereof, serving as a complemental cam track portion, and means supported by said cam disc to limit adjustably the approach of said abutment body to the center of said cam disc, thereby to regulate the inward extent of the retirement of said cam segment.

17. A dough divider having the features claimed in claim 12 in which said block and cam track are mounted upon a plate or member having a slot-and-screw connection with the supporting structure of the divider, whereby the plate and its associated parts can be adjusted around the center of the peripheral cam track, thereby regulating the timing of the charging and discharging operations.

18. A cam segment for use in conjunction with a dough divider having the features claimed in claim 12, in which said segment has a cylindrical body provided with an arm having an arcuate surface to conform with the general curvature of the cam track; said cylindrical body having a slot disposed lengthwise at the other end of the body and adapted to receive a swinging strut; and a post extending laterally from said body and adapted to pass through a guide slot in the supporting block, said post having a head roll adapted to project beyond said block for engagement with a J-shaped damping member.

19. A bearing block for use in conjunction with a dough divider having the features set forth in claim 12, in which said block is of generally triangular form, having its longest side curved to conform with the general curvature of the cam track, said block having a slot or bore of generally keyhole shape in cross section with an open side extending lengthwise, said block having an elongated slot in one side face adapted to permit passage of a post upon the cylindrical body of a cam segment mounted slidingly within said bore, and the walls of said slot serving as a guide for the side edges of a curved arm projecting from said cylindrical body segment.

20. An apparatus having the features claimed in claim 9, in which means are provided to return said segment yieldingly toward the peripheral cam track, and means to damp said return and absorb the shock at the end of the return movement.

21. A dough divider having the features claimed in claim 1, in which said mechanism for moving the pistons to discharge dough includes a cam provided with a shock-absorbing part biased yieldingly toward the path of reciprocation of said pistons and adapted to act as means to damp the shock of the inward movement of each piston under dough pressure, said yielding cam part constituting in every position a continuation of the main track portion of the cam, so that each piston is at all times in operative connection with the cam surface, and thus said damping means serves to prevent rebound of a piston, avoiding interference with the proper measurement of a charge.

22. In a dough divider having a source of supply of dough under pressure, a rotor provided with a plurality of pockets arranged to communicate periodically with said source and pistons reciprocable in said pockets for receiving and discharging measured quantities of dough, the combination with cam mechanism for moving said pistons in one direction, during rotation of said rotor, to discharge dough from said pockets, said cam mechanism including a central cam having a cam track with a movable cam segment, of a rotatable support upon which said cam track and segment are mounted, said support having means serving to permit rotative adjustment of said cam bodily, with its segment, and securement in adjusted rotative position, whereby each piston in turn can be caused to fall back more or less ahead of complete registration with the dough receiving opening, either for greater speed or for allowing more filling time, or for passing the dough through a relatively restricted opening for its effect on the dough.

HERBERT C. RHODES.